United States Patent

Lieberman

[15] 3,688,222

[45] Aug. 29, 1972

[54] MATCHED ULTRASONIC DELAY LINE WITH SOLDERABLE TRANSDUCER ELECTRODES

[72] Inventor: Stuart I. Lieberman, Montgomery County, Md.

[73] Assignee: The United States of America as represented by the Secretary of the Army

[22] Filed: March 18, 1971

[21] Appl. No.: 125,680

[52] U.S. Cl. ....................333/30, 117/217, 29/25.35, 310/9.7

[51] Int. Cl. ................................................H03h 7/30

[58] Field of Search ............333/30, 72; 310/9.7, 9.8; 117/217; 29/25.35

[56] References Cited

UNITED STATES PATENTS

| | | | |
|---|---|---|---|
| 3,469,120 | 9/1969 | Nagao et al. | 333/30 X |
| 2,859,346 | 11/1958 | Firestone et al. | 333/30 |
| 2,694,185 | 11/1954 | Kodama | 310/9.7 X |
| 3,495,105 | 2/1970 | Shimano | 310/9.7 X |
| 3,174,120 | 3/1965 | Brouneus | 333/30 |
| 3,465,178 | 9/1969 | Pardue | 310/9.7 |
| 3,209,178 | 9/1965 | Koneval | 310/9.8 X |

*Primary Examiner*—Herman K. Saalbach
*Assistant Examiner*—Saxfield Chatmon, Jr.
*Attorney*—Harry M. Saragovitz, Edward J. Kelly, Herbert Berl and Saul Elbaum

[57] ABSTRACT

A transducer region of an ultrasonic delay line includes first and second off-set electrode layers located on opposite sides of a piezoelectric layer with only portions of the electrodes being aligned. The first electrode is disposed over part of a surface of the delay line, the piezoelectric layer is located over part of the first electrode, and the second electrode is partially located over the piezoelectric layer in alignment with said part of the first electrode. The offset electrodes permit simple solder connections to be made to a lumped parameter matching impedance without damaging the piezoelectric material.

10 Claims, 10 Drawing Figures

INVENTOR
STUART I. LIEBERMAN

By Harry M. Saragovitz, Edward J. Kelly,
Herbert Berl & Saul Elbaum
ATTORNEYS

MATCHED ULTRASONIC DELAY LINE WITH SOLDERABLE TRANSDUCER ELECTRODES

The invention described herein may be manufactured, used and licensed by or for the United States Government for governmental purposes without the payment to me of any royalty thereon.

BACKGROUND OF THE INVENTION

The present invention relates to ultrasonic delay lines and more particularly to an improved electrode configuration for an ultrasonic delay line transducer whereby a lumped parameter matching impedance for the transducer can be safely soldered directly to the electrodes.

Certain prior art approaches to impedance-matching for ultrasonic delay line transducers have been rather complex and have resulted in rather large structures. For example one prior art approach is to employ a distributed parameter impedance connected across the transducer terminals. Distributed parameter impedances are often as much as ten times the size of lumped parameter impedances. Consequently, where space economy is a consideration, a lumped parameter approach is more desirable. In addition, if it is desired to change the transducer frequency response, distributed parameter impedances are not readily capable of tuning whereas lumped parameter impedances can be easily interchanged.

Prior art approaches to employing lumped parameter matching impedances for ultrasonic delay line transducers have had inherent disadvantages. For example, it is common to provide current leads extending from the electrodes to respective terminals of as lumped parameter impedance. This significantly extends the dimensions of the delay line unit and renders it subject to shorting and failure due to shock and vibration. To reduce overall size and improve shock resistance it would be desirable if the lumped parameter impedance could be soldered directly to the transducer electrodes. Even more desirable would be the ability to deposit the lumped parameter impedance in a layer, soldered directly to the electrodes. However, prior art electrode structures, consisting of aligned electrode layers, one on each side of the transducer, do not permit of direct soldering to the electrodes without causing significant damage to the piezoelectric transducer material.

It is therefore an object of the present invention to provide an ultrasonic delay line having improved transducer electrode structure which permits direct soldering of a lumped parameter impedance to the electrodes.

SUMMARY OF THE INVENTION

In accordance with the principles of the present invention, the transducer electrode layers are only partially aligned, leaving considerable off-set regions of the electrodes. These off-set regions are sufficiently removed from the transducer material to preclude damage thereto upon direct soldering of a lumped parameter impedance to the electrodes. The electrode orientation can be arranged to permit a flat layer, comprising the lumped parameter impedance, to be deposited on a surface of the delay line, providing a resulting structure which is compact and shock resistant.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figure 1:
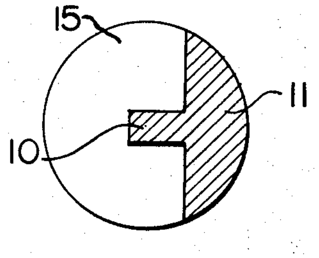
FIGS. 1 through 4 are end views of an ultrasonic delay line in respective stages of development according to the principles of the present invention.
Figure 6:
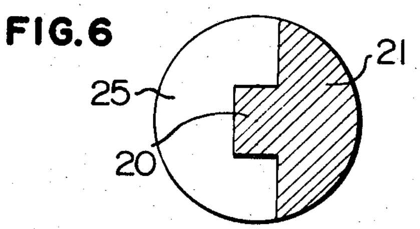
FIGS. 6 through 9 are end views of an alternative ultrasonic delay line embodiment in respective stages of development according to the principles of the present invention.

Referring to FIGS. 1 through 5 of the accompanying drawings, there is illustrated one end of an ultrasonic delay line 15 comprising material such as quartz, sapphire, or other suitable delay medium. Over a portion of the end of the delay line there is deposited (for example, by vacuum deposition) an electrode layer 11 of suitable electrically conductive metal or metals, as best illustrated in FIG. 1. The actual configuration of electrode layer 11 is not important, other than the fact that it does not cover the entire end of the delay line. In the configuration illustrated in FIGS. 1–5, electrode layer 11 is provided with a finger-like portion 10 which projects away from the main body of the layer.

Figure 2:
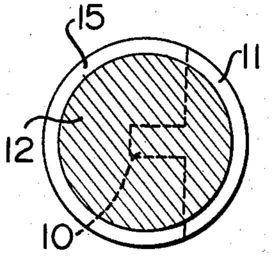
Figure 7:
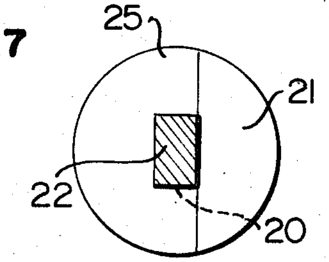

As illustrated in FIG. 2, a layer of piezoelectric material (or other electromechanical transducing material) 12 is deposited, sputtered, evaporated, etc. over part of electrode layer 11, particularly over projection 10. As illustrated, part of the piezoelectric layer also covers some, but not all, of the exposed surface at the end of delay line 15. As will be more fully explained relative to FIGS. 6 through 10, piezoelectric layer may be deposited to cover only a portion of electrode layer 11 without overlapping some of the exposed surface of the delay line.

Figure 3:
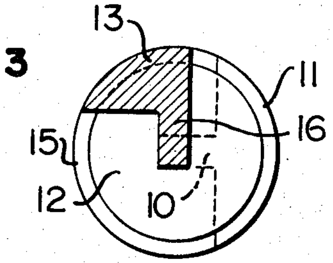
Figure 8:
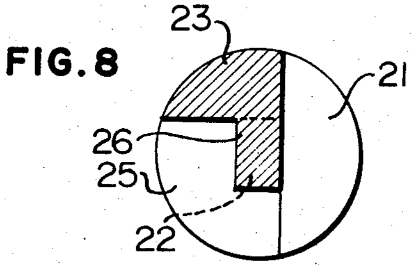
Figure 4:
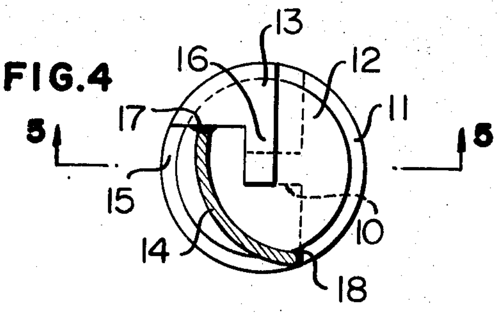
Figure 9:
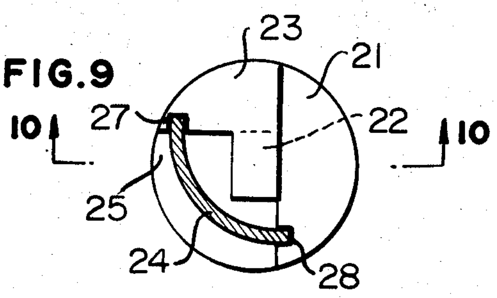
Figure 5:
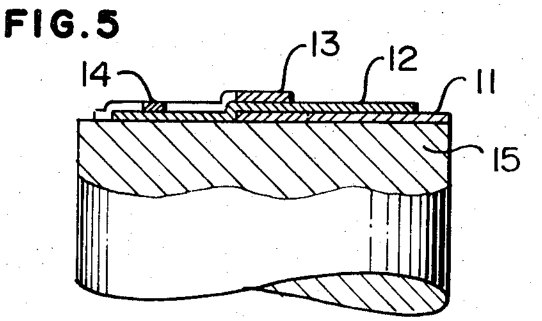
FIG. 5 is a view in section taken along lines 5—5 of FIG. 4.
Figure 10:
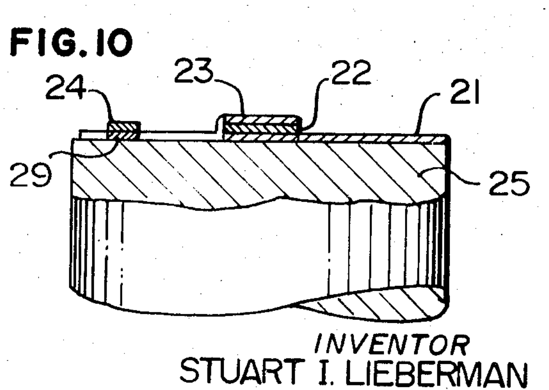
FIG. 10 is a view in section taken along lines 10—10 of FIG. 9.

As best illustrated in FIG. 3, a second electrode layer 13 of suitable electrically conductive metal or metals is deposited over part of piezoelectric layer 12 and part of the exposed region of the end of delay line 15. Once again, the actual configuration of electrode layer 13 is not crucial. Importantly, however, part of electrode layer 13 must align with part of electrode layer 11 through piezoelectric layer 12. For this purpose, electrode layer 13 is provided with a finger-like projection 16 which overlies that portion of piezoelectric layer 12 which covers projection 10 of electrode layer 11. The region of piezoelectric layer 12 lying between the two projections 10 and 16 is the active transducer region.

Another important characteristic of electrode layer 13 is the fact that it is off-set from electrode layer 11 and covers a portion of delay line 15 which is not covered by electrode layer 11. This characteristic permits a lumped parameter impedance 14 to be placed on the end of the delay line between exposed edges of electrode layer 11 and 13. In addition, since these edges of the electrode layers are remote from the active transducer region, the impedance 14, for example, an inductance comprising a thin selectively deposited layer of metal, can be directly soldered to the electrode edges at 17, 18 without damaging the transducer.

As illustrated, impedance 14 is deposited, in part, over an exposed portion of piezoelectric layer 12. It may also be deposited on the end of the delay line 15 so as to avoid the piezoelectric layer. In addition, impedance 14 need not be a deposited layer but may be a commercial component placed at the end of the delay line and soldered directly to the electrode layer at points 17, 18. Such a component can easily be replaced if it is desired to change the frequency range of the transducer arrangement, the change being accomplished by straight-forward soldering techniques performed without worry over harming the transducer.

An alternative embodiment of the present invention is illustrated in FIGS. 6 through 10. A delay line 25 includes a first electrode layer 21, a piezoelectric layer 22, and a second electrode layer 23, similar to electrode 11, piezoelectric layer 12, and electrode 13 of FIGS. 1–5. Piezoelectric layer 22 differs from layer 12 in that it is selectively deposited, as by conventional masking techniques, to overlie only projection 20 of electrode layer 21. Projection 20 corresponds to projection 10 of FIG. 1 but has a somewhat greater area. Likewise projection 26 from electrode layer 23 corresponds to projection 16 of FIG. 1 but has a somewhat greater area and is aligned with all of projection 20. In this configuration, all of piezoelectric layer 22 is in the active transducer region between the aligned portions of the two electrodes. Impedance 24 may be selectively deposited directly on the exposed surface of delay line 25 and soldered at points 27, 28 to the edges of respective electrode layers 13, 11. Alternatively, an insulation layer 29 of material such as silicon dioxide, may be selectively deposited before impedance 24. Insulation layer 29 precludes any undesirable interaction between the metal of impedance 24 and the delay material of delay line 25. Of course, impedance 24 may be a commercially lumped parameter component soldered at points 27, 28 rather than a selectively deposited layer.

The important feature of the present invention is the provision of off-set electrodes which are partially aligned through transducer material and spaced on the delay line surface to permit a lumped parameter impedance to abut the delay line surface and be soldered between the electrodes. This results in structure which is more compact than prior art delay lines and in which the impedance is secured to the delay line in a shock-resistant manner. Moreover, the impedance can be easily changed, if desired, by simply unsoldering one impedance and soldering the replacement impedance between the electrodes. To these ends, the particular configurations of the electrode layers and piezoelectric layer can be considerably varied from the configurations illustrated.

It should be understood that the invention is not limited to the exact details of construction shown and described herein for obvious modifications will occur to persons skilled in the art.

I claim:

1. An ultrasonic delay line comprising:
   - an ultrasonic delay member having a first surface;
   - a first electrode layer covering and in contact with part of said first surface;
   - a layer of electromechanical transducer material covering and in contact with a specified region of said first electrode layer; and
   - a second electrode layer, partially off-set relative to said first electrode layer, covering and in contact with said transducer material in said specified region and covering and in contact with an exposed part of said first surface of said delay member.

2. The delay line according to claim 1 further comprising a lumped parameter impedance soldered directly to each of said electrode layers.

3. The delay line according to claim 1 wherein said first and second electrode layers include respective first and second edges which are spaced along said first surface, said delay line further comprising a lumped parameter impedance abutting said first surface and soldered to said first and second edges.

4. The delay line according to claim 3 wherein said impedance is an inductance comprising a thin metal layer deposited on said first surface.

5. The delay line according to claim 4 further comprising an insulation layer interposed between said thin metal layer and said first surface.

6. The delay line according to claim 1 wherein said first and second electrode layers include respective first and second projection aligned in said specified region and further comprising a lumped parameter impedance soldered to respective portions of said electrode layers remote from said specified region.

7. The delay line according to claim 1 wherein said transducer material is piezoelectric material.

8. A method of fabricating an improved ultrasonic delay line comprising the steps of:
   - depositing a first electrode layer on a portion of a surface of a delay line;
   - bonding a piezoelectric layer to a specified region of said first electrode;
   - depositing a second electrode, off-set from said first electrode, over another portion of said surface and over said piezoelectric layer in said specified region.

9. The method according to claim 8 further comprising the steps of:
   - selectively depositing a thin metal impedance layer on said first surface; and
   - soldering said impedance layer to each electrode layer at points remote from said specified region.

10. The method according to claim 8 further comprising the step of:
    - soldering a lumped parameter impedance to a point on each of said electrode layers which is remote from said specified region.

* * * * *